United States Patent [19]

Le Cun et al.

[11] Patent Number: 5,412,754
[45] Date of Patent: May 2, 1995

[54] REVERSE TIME DELAY NEURAL NETWORK FOR PATTERN GENERATION

[75] Inventors: Yann A. Le Cun, Lincroft; Patrice Y. Simard, Eatontown, both of N.J.

[73] Assignee: AT&T Corp., Murray Hill, N.J.

[21] Appl. No.: 906,928

[22] Filed: Jun. 30, 1992

[51] Int. Cl.⁶ ............................................. G06F 15/18
[52] U.S. Cl. ..................................... 395/24; 395/62; 395/22; 395/23
[58] Field of Search ....................... 395/24, 21, 62, 22, 395/23

[56] References Cited

U.S. PATENT DOCUMENTS

| | | | |
|---|---|---|---|
| 4,752,906 | 6/1988 | Kleinfeld | 395/24 |
| 4,852,010 | 7/1989 | Grossberg et al. | 395/94 |
| 4,874,963 | 10/1989 | Alspector | 395/24 |
| 4,990,838 | 2/1991 | Kawato et al. | 395/81 |
| 5,105,468 | 4/1992 | Guyon et al. | 382/14 |

OTHER PUBLICATIONS

Parallelism, Hierarchi, Scaling in Time–Delay NN for Spotting Japanese Phonemes/CV–Syllables 18–22–/Jun./1989, H Sawai et al. pp. II–81–88.

Adaptation and Learning for Robotic Manipulator by NN T. Fukuda et al. 5–7 Dec. 1990 pp. 3283–3288.

{0,1}ⁿ Space Self-Organising Feature Maps—Extensions and Hardware Implementations Allinson et al. IEE Conf. Publ. 1989 Oct. 16–18.

M. I. Jordan, *Computer and Information Science*, Univ. of Mass. at Amherst, May 1988, "Supervised Learning and Systems with Excess Degrees of Freedom," pp. 13–17.

B. A. Pearlmutter, *Neural Computation*, vol. 1, 1989, "Learning State Space Trajectories in Recurrent Neural Networks," pp. 263–269.

A. Waibel et al., *IEEE Trans. on Acoustics, Speech, and Signal Proc.*, vol. 37, No. 3, Mar. 1989, "Phoneme Recognition using Time–Delay Neural Networks," pp. 328–339.

C. C. Tappert et al., *IEEE Trans. on Pattern Analysis and Machine Intell.*, vol. 12, No. 8, Aug. 1990, "The State of the Art in On–Line Handwriting Recognition," pp 787–808.

I. Guyon et al., *Pattern Recognition*, vol. 24, No. 2, 1991 "Design of a Neural Network Character Recognizer for a Touch Terminal," pp. 105–119.

*Primary Examiner*—Allen R. MacDonald
*Assistant Examiner*—Richemond Dorvil
*Attorney, Agent, or Firm*—Gregory C. Ranieri

[57] ABSTRACT

Trajectories are generated in response to an input label by using a reverse time delay neural network. The reverse time delay neural network comprises an input layer, a plurality of hidden layers, and an output layer, all arranged in succession so that the number of frames per layer increases as the network is traversed from the input layer to the output layer. Additionally, the number of features decreases as the network is traversed from the input layer to the output layer. Features of the trajectory are created from the input label so that a time series of frames can be output by the network. Frames generally relate to particular epochs of time or time units and a frame includes a plurality of features.

Interconnection between layers is accomplished using differential neuron units. In the differential neuron unit, standard neuron weighting, summing, and nonlinear squashing functions are performed on the inputs thereto. Moreover, the output of the differential neuron unit includes a contribution from the value of the corresponding feature in the previous frame in the same layer as the differential neuron unit output.

11 Claims, 7 Drawing Sheets

TIME →

FIG. 11

TIME →

FIG. 12

TIME →

FIG. 13

TIME →

REVERSE TIME DELAY NEURAL NETWORK FOR PATTERN GENERATION

TECHNICAL FIELD

This invention relates to pattern generation and, more particularly, to computation networks trajectory generation and time-series prediction including on-line, real-time prediction.

BACKGROUND OF THE INVENTION

Adaptive solution of nonlinear control problems is required in such fields as robotics, automation, filtering, and time series prediction. The solution is generally in the form of a trajectory, that is, a variable or set of variables whose values change as a function of time. In order to compute the trajectory, it has been suggested that recurrent neural networks be used because of their ability to learn from examples. However, the architecture of such recurrent networks has shown significant limitations in reproducing relatively simple trajectories such as a circle and a figure eight.

SUMMARY OF THE INVENTION

Dramatic performance improvement is obtained for trajectories generated in response to an input label by using a reverse time delay neural network. Features of the trajectory are created from the input label so that a time series of frames can be output by the network. Frames generally relate to particular epochs of time or time units whereas a frame includes a plurality of features.

The reverse time delay neural network comprises an input layer, a plurality of hidden layers, and an output layer, all arranged in succession so that the number of frames per layer increases as the network is traversed from the input layer to the output layer. Additionally, the number of features decreases as the network is traversed from the input layer to the output layer.

Interconnection between layers is accomplished using differential neuron units. In the differential neuron unit, standard neuron weighting, summing, and nonlinear squashing functions are performed on the inputs thereto. Moreover, the output of the differential neuron unit includes a contribution from the value of the corresponding feature in the previous frame in the same layer as the differential neuron unit output.

Phantom state units are included in each hidden layer between actual units in order to provide additional smoothing for the trajectory and, more importantly, to provide the same number size input field to each neuron. With phantom state units, each neuron for the same feature in a particular layer can be identical employing the same weighting kernel. Phantom state units receive no input from the prior layer and may be subject to interpolative value setting from a like feature in a surrounding frame or from like features in surrounding frames.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

In the description which follows, the process and apparatus for trajectory generation are explained in the task-related environment of creating cursive script characters and numerals from an input label. This explanation is useful in developing an understanding of the principles of the present invention. However, the principles of this invention are not limited to this problem. Rather, they extend to many control problems in which a trajectory solution is required.

When viewing the character generation problem, the trajectory is generally in the form of a sequence of coordinates [x(t), y(t)] usually accompanied by a third element representing the up or down state of the pen drawing the character. The input label may be as simple as a keystroke representing the alphabetic or numeric character.

The present reverse time delay neural network is a multi-layer feed-forward network, the layers of which perform oversampling of the prior layer with successively reduced level of feature generation and final creation of the trajectory. A time delay neural network used for speech recognition was proposed by Waibel et al., *IEEE Trans. Acoustics, Speech, and Signal Processing*, Vol. 37, No. 3, pp. 328–39 (1989) and a different time delay neural network was patented by Guyon et al. in U.S. Pat. No. 5,105,468.

The network was trained to generate capital letters with a modified version of the back-propagation algorithm. Training was conducted using only 10,000 iterations. The trajectory generator was implemented on a standard personal computer work station.

This implementation of the reverse time delay neural network is sequential. It is contemplated that speed can be improved by parallelization and/or pipelining. Ideally, the generated trajectory would be available as soon as the last input label is presented. But the latency of the present time delay neural network is relatively insignificant.

Figure 1:
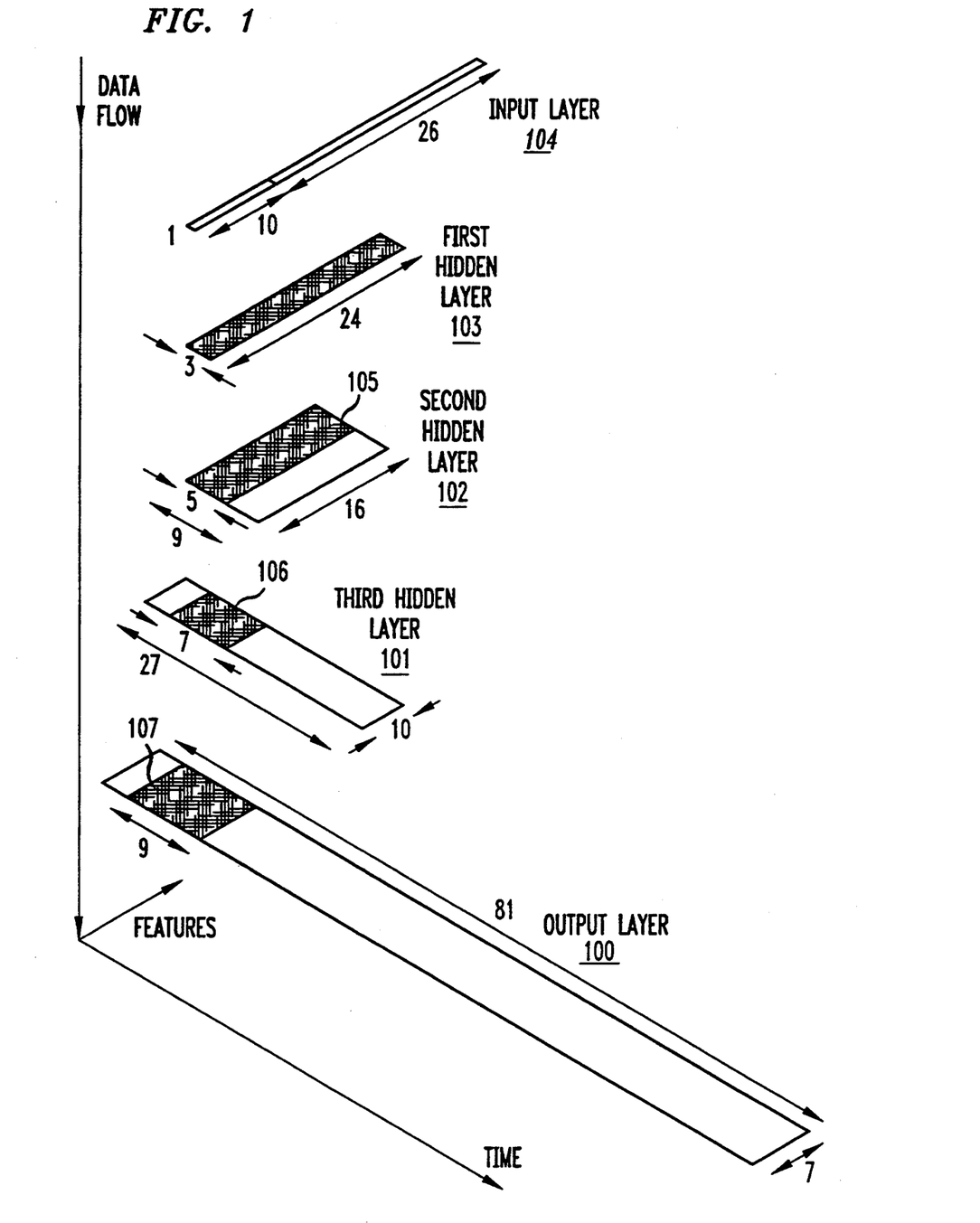
FIGS. 1 and 2 show simplified diagrams of the layers in the reverse time delay neural network in accordance with the principles of the present invention.
Figure 2:
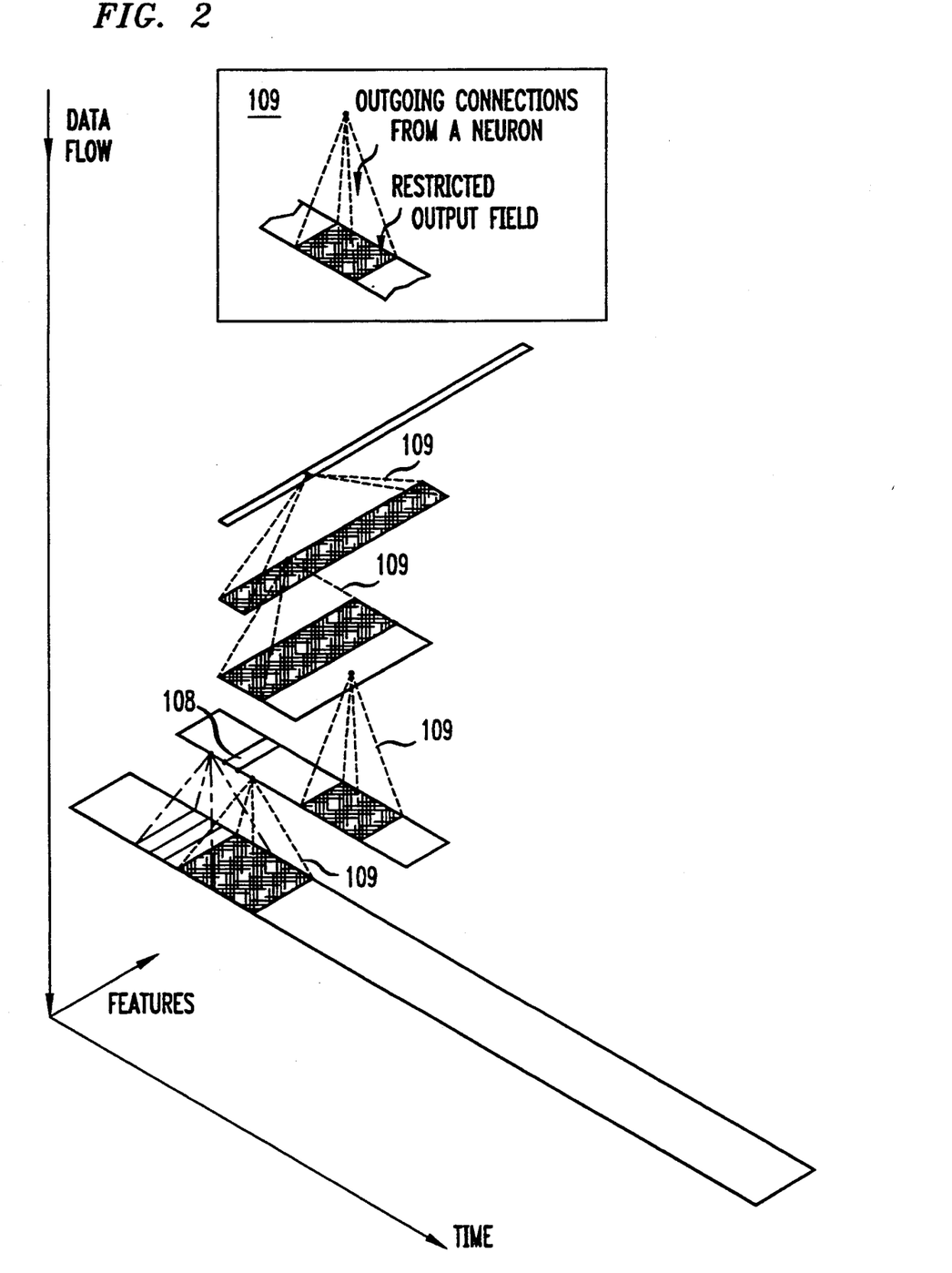

The architecture of the network as shown in simplified form in FIGS. 1 and 2 is classified as a Reverse Time Delay Neural Network. This network is a multi-layer feed-forward network, the layers of which perform successively reduced levels of feature extraction and the final trajectory generation. Connections from units in one layer to units in another layer are made through computational elements or neurons.

Figure 3:
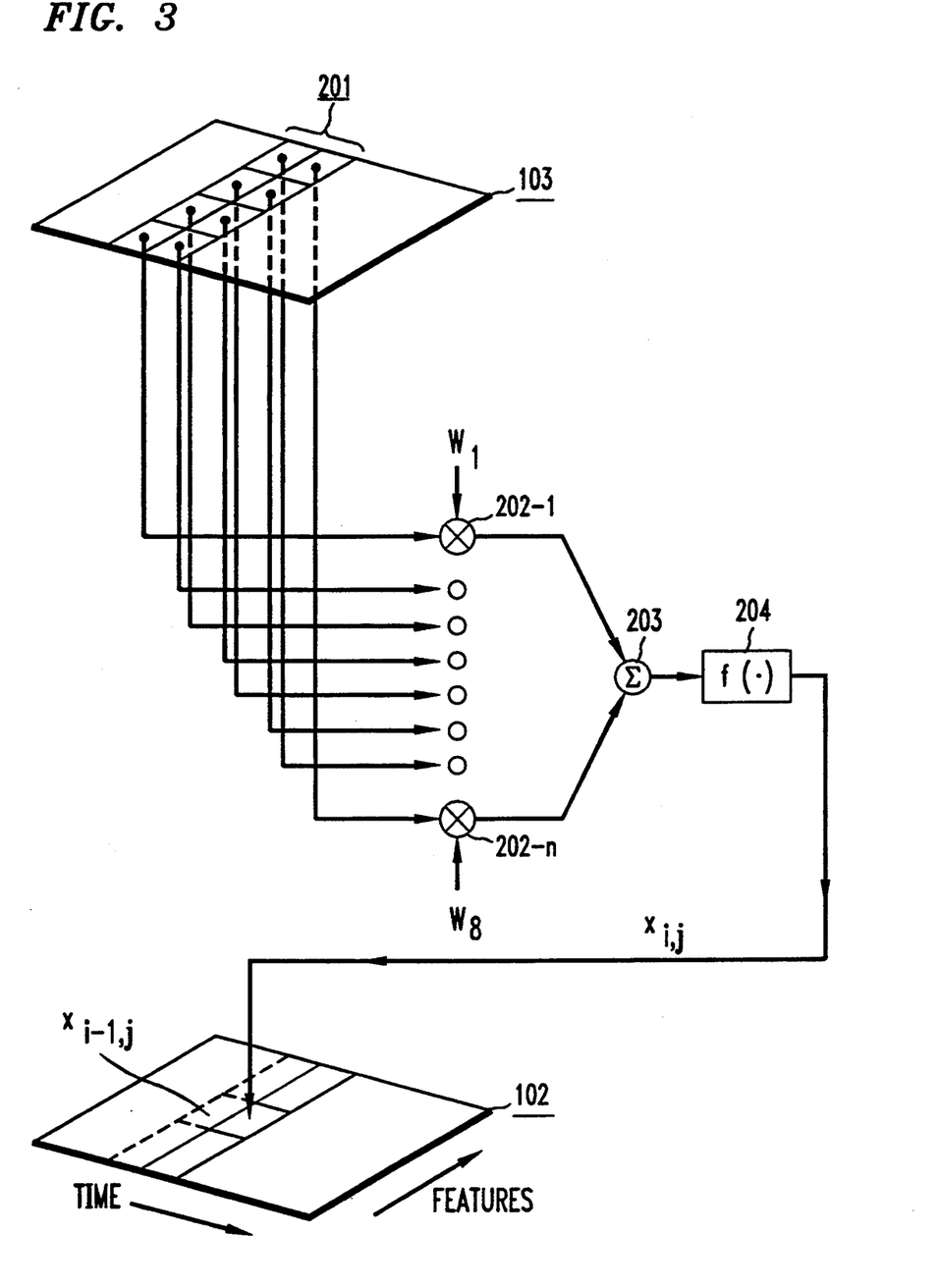
FIG. 3 shows a neuron for use in the reverse time delay neural networks of FIGS. 1 and 2.
Figure 4:
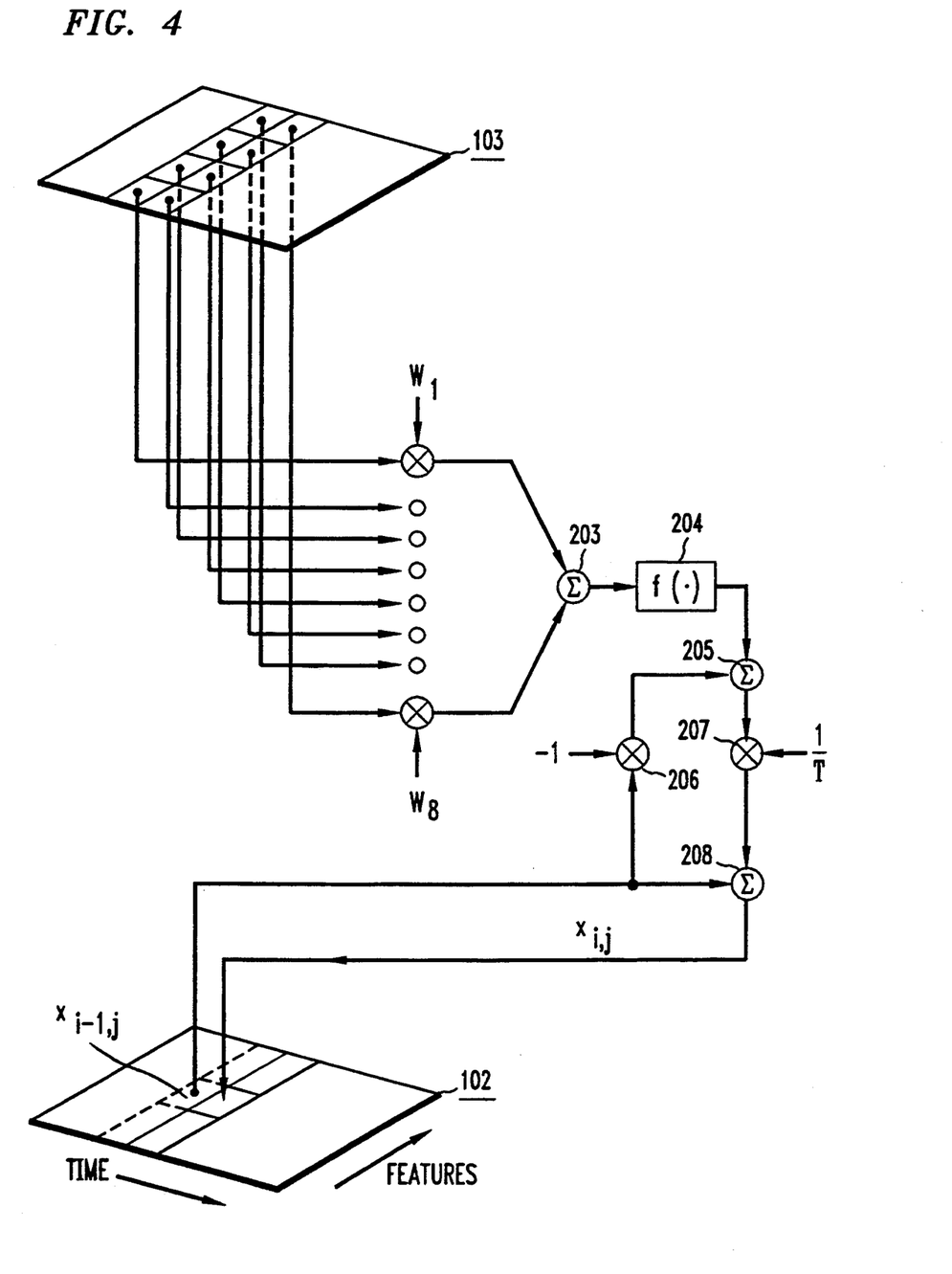
FIG. 4 shows an alternative embodiment of the neuron in FIG. 3 employing differential neuron units.

Computational elements or neurons as shown in FIGS. 3 and 4 form the fundamental functional and interconnectionist blocks between layers for the reverse time delay neural network realized in accordance with the principles of the invention. In general, a neuron forms a weighted sum of input values for n inputs (e.g., n=8 in FIG. 3) and passes the result through a nonlinearity f(·) to arrive at a single value denoted as $x_{ij}$, where i refers to the epoch or time unit and j refers to the feature level in a layer. Input and output values for the neuron may be analog, quasi-analog such as multi-level and gray scale, or binary in nature. Nonlinearities commonly employed in neurons include hard limiters, threshold logic elements, and sigmoid nonlinearities, for example.

The neuron depicted in FIG. 3 is a so-called unfolded time delay neuron. It is equivalent to a neuron having inputs from a single frame or feature vector, which inputs are then fanned out in parallel paths to delays varying from a zero unit delay to an (K−1) unit delay where K frames or feature vectors are in the receptive field of a neuron. Such a neuron is a folded time delay neuron and is depicted in FIG. 1 of the above identified Waibel et al. article, which is expressly incorporated herein by reference.

In operation, the neuron shown in FIG. 3 scans n neighboring input elements 201 from a frame sequence in layer 103. The frame sequence is defined as a sequence of feature vectors as shown in the layers of the network in FIGS. 1 and 2 and in FIG. 9. Feature vector elements have values represented as $a_i$ for i=1, ... n. In the example shown in FIG. 3, n is set to 8. An input bias may be supplied to an n+1$^{th}$ input of a neuron which has been omitted from the figure and from the following description for the sake of ease in understanding. For completeness, the bias is generally set to a constant value such as 1.

Input values from units or feature elements in a layer are supplied to multipliers 202-1 through 202-n (an extra multiplier 202-(n+1) which is not shown is used for the bias input), where n is equal to 8 in this example. The multipliers also accept input from a kernel having weights $w_1, \ldots w_n$ (n=8). Outputs from all multipliers are supplied to summing junction or adder 203 which generates the weighted sum of the input feature vector element values. As such, the output from adder 203 is simply the dot product of a vector of input feature vector element values (including a bias value, if applicable) with a vector representing the kernel of weights. The output value from adder 203 is passed through the nonlinear function in nonlinearity 204 to generate a single unit output value $x_{ij}$. As will be understood more clearly below, unit output value $x_{ij}$ is related to the value of the j$^{th}$ feature in the i$^{th}$ frame or epoch (time unit) in layer 102 under consideration.

In an example from experimental practice, an exemplary sigmoid (squashing) function for nonlinearity 204 is chosen as a scaled hyperbolic tangent function, $f(\alpha) = A \tanh S\alpha$ where $\alpha$ is the weighted sum input to the nonlinearity, A is the amplitude of the function, and S determines the slope of the function at the origin. As depicted above, the nonlinearity is an odd function with horizontal asymptotes at +A and −A. It is understood that nonlinear functions exhibiting an odd symmetry are believed to yield faster convergence of the kernel weights $w_i$. In an example from experimental practice, the amplitude A was set to 1.716 while the slope S was set to ⅔. Weights for each of the kernels in the time delay neural network were obtained by supervised training using a trial and error learning technique known as back propagation. See Rumelhart et al., "Learning Internal Representations by Error Propagation," *Parallel Distributed Processing: Explorations in the Microstructure of Cognition*, Vol. I, pp. 318-362 (1986) or see R. P. Lippmann, "An Introduction to Computing with Neural Nets", *IEEE ASSP Magazine*, Vol. 4, No. 2, pp. 4-22 (1987). Prior to training, each weight in the kernel is initialized to a random value using a uniform distribution between, for example, $-2.4/F_i$ and $+2.4/F_i$ where $F_i$ is the number of inputs (fan-in) of the unit to which the connection belongs. For the example shown in FIG. 3, the fan-in $F_i$ is equal to n (n=8).

The weights are adjusted during a supervised training session which performs gradient descent in weight space with a cost function. An exemplary output cost function is the well known mean squared error function:

$$MSE = \frac{1}{OPT} \sum_t \sum_p \sum_o \frac{1}{2} (d_{opt} - x_{opt})^2 \quad (1)$$

where T is the number of time steps in the output sequence, P is the number of patterns, O is the number of output units, $d_{opt}$ is the desired state for output unit o at time t when pattern p is presented, and $x_{opt}$ is the state for output unit o at time t when pattern p is presented. During training, vectors representing character classes are presented at the input, and corresponding sequences representing the pen trajectory are presented as desired outputs. Weights are updated according to the stochastic gradient or "on-line" procedure after each presentation of a single image pattern for recognition. A true gradient procedure may be employed for updating so that averaging takes place over the entire training set before weights are updated. It is understood that the stochastic gradient is found to cause weights to converge faster than the true gradient especially for large, redundant data bases.

The training procedure preserves the convolutional constraint, described in more detail below, on the connection pattern when it modifies the weights. This is implemented by weight sharing.

Each element in a feature vector (frame) has a value associated with it. These will be described in more detail below. The values of feature vector elements are then stored in memory devices. When reference is made to a particular feature vector or frame sequence, it is understood that the term feature vector element includes unit values and feature vector elements output from each neuron combining to form a new feature vector sequence in a hidden layer or output layer.

Realization of the neurons and, for that matter, the entire network may be in hardware or software or some convenient combination of hardware and software. Much of the network presented herein has been implemented using a SUN workstation with simple programs performing the rudimentary mathematical operations of addition, subtraction, multiplication, and comparison. Pipelined devices, microprocessors, and special purpose digital signal processors also provide convenient architectures for realizing the network in accordance with the principles of the invention. MOS VLSI technology may be employed to implement particular weighted interconnection networks of the type shown in FIG. 2. Local memory is desirable to feature element values and other temporary computation results.

The reverse time delay neural network exhibits a local, convolutional layered structure having input layer 104, first hidden layer 103, second hidden layer 102, third hidden layer 101 and output layer 100. Data flow through the network goes from input layer 104 down through output layer 100. It is a feed-forward layered network. In the exemplary case shown in FIGS. 1 and 2, there are four layers of weights connecting five layers of units. The weights are associated with the four sets of output connections 109 of the neurons interconnecting the five layers. Layers other than the input layer (label) and the output layer (trajectory) are called "hidden" layers. Outgoing connections 109 of a neuron are equivalent to the neurons described above since it shows the interconnection of a particular unit in a prior layer to all the units it influences in a subsequent layer.

Connections in the network are designed to be local. A particular unit or neuron has an input receptive field that is limited in the time direction. That is, all its inputs come from a group of consecutive frames in the previous layer. The input receptive field of unit i will have considerable overlap with the input receptive field of unit $i-1$, if the input receptive fields extend far enough along the time axis. Alternatively, the output restricted fields (shown cross-hatched in FIGS. 1, 2, and 9) show the locally broad effect a unit in a prior layer has on units in a subsequent layer.

The network is convolutional. That is, the weights connecting one frame (in layer $m+1$) to its input receptive field (in layer m, the prior layer) are the same as the weights connecting the next frame in the same sequence to the next input receptive field. In effect, two successive frames correspond to a single set of neurons observed at two successive time steps.

The final specialization of our network is that each layer has a finer time representation than the preceding layer. This is implemented by oversampling: one value in the prior layer produces or influences different convolution values which are all retained. Oversampling causes small disjoint groups of adjacent neurons in a subsequent layer to have effectively congruent input receptive fields in the prior layer. That is, if neuron 1 in the first hidden layer 103 has its input receptive field beginning with frame 1 in the input layer 104, then neuron 2 in the first hidden layer would have its input receptive field beginning with the same frame, frame 1 in the input layer. A network of this type is called a reverse time-delay neural network since each neuron decision at time $n-m, \ldots, n-1$ is based on frame f(n) where m is the length of the weight kernel. The convolutional structure of the network can be thought of in two complementary ways: as a single neuron scanned over its input sequence (re-use in time and sequential processing), or as a group of neurons with weights constrained to be equal (replication in space; parallel processing). In either case we will refer to the neuron(s) controlled by a single kernel as a regiment. Note that the regiment's complete operation does not meet the strict definition of a convolution, because of the nonlinear squashing function, and because of the oversampling. Certainly it is a convolution in spirit.

Interpretation of the kernels that are obtained by training is in general a very tedious task. Most kernels cannot readily be interpreted as generating simple or obvious trajectory features, but rather complicated combinations thereof.

As outlined in FIGS. 1 and 2, the frame representation in first hidden layer 103 is obtained by applying several regiments to the input label (one regiment per feature-vector component in that hidden layer) in input layer 104 which is connected to the first hidden layer. In turn, second hidden layer 102 applies several regiments to the frames just created by first hidden layer 103. By repeating this operation (convolution with squashing and oversampling), we generate progressively more complex trajectories, where one frame has greater influence over progressively narrower portions of the output restricted field. Finally comes output layer 100, which is connected to the third hidden layer 101. In this respect, the output trajectory (frame sequence) of the network can be considered as containing the highest frequency components whereas the input label contained the lowest frequency components in the network.

It is contemplated that the network have at least one hidden layers for satisfactory performance although a greater number of hidden layers are shown in the drawing. In addition, the number of features per frame and the number of frames per layer are matters of design choice. But, it is contemplated that the number of frames in one layer is always at least twice the number of frames in the previous layer as a result of oversampling. As shown in FIG. 1, input layer 104 comprises 1 frame having 36 features per frame divided into ten digit features (0-9) and 26 letter features (A-Z). By oversampling with a factor of 3, first hidden layer 104 comprises 3 frames having 24 features per frame. In the transition to second hidden layer 102, oversampling by a factor of 3 causes layer 102 to have nine frames of 16 features per frame. Third hidden layer 101 comprises 27 frames of 10 features each as a result of oversampling by a factor of 3. Finally, output layer 100 comprises a trajectory of 81 frames with 7 features per frame. In order to perform pen trajectory generation, it is only required that there be 3 features per frame in the output trajectory, namely, pen-up/pen-down, and the two position coordinates (x,y).

For the example shown in FIG. 1, neurons connected from third hidden layer 100 have an output restricted field covering all seven features in nine consecutive frames of output layer 101. Second hidden layer 102 is connected to neurons which cover an output restricted field covering all ten features of seven consecutive frames in layer 101. Neurons connected to third hidden layer 103 have an output restricted field covering all 16 features in five consecutive frames of layer 102. Finally, neurons connected to input layer 104 have an output restricted field covering all 24 features in all three frames of layer 103. As stated above, the size of the output restricted field and, alternatively, the size of the input receptive field and therefore the size of the kernel are matters of design choice. In the example above, the kernel size has been chosen so that the number of inputs per neuron is substantially constant as will be seen in FIGS. 6-8 below. For this example, the kernel affects an ever increasing fraction of the frames in a given subsequent layer.

The increase of time resolution in the feature vectors (sequence of frames) due to oversampling is partially compensated by a concomitant decrease in the number of features. This is called "bi-pyramidal" scaling because, as the layer size increase along the time dimension, it decreases along the feature dimension. The number of units, and therefore the information-carrying capacity, in each layer is reduced less than the oversampling along might suggest.

An alternative neuron embodiment is shown in FIG. 4 incorporating modifications over the neuron shown in FIG. 3. These modifications include the use of discrete differential units. Continuous differential units are described by Pearlmutter in *Neural Computation*, Vol. 1, pp. 263–269 (MIT 1989). In their discrete form, the differential units are described as follows:

$$x_i = x_{i-1} + \frac{\Delta t}{T}(-x_{i-1} + f(wx_{i-1}) + I_{i-1}) \quad (2)$$

where x is the activation vector for the units, T is the diagonal matrix such that $T_{ii}$ is the time constant for unit i, $I_i$ is the input vector at time unit (epoch) i, and f is a differentiable function as described above. To further understand this equation, it should be noted that $\Delta t$ is the time step used in making the differential units discrete, the subscript i refers to time t$\Delta$t, $x_0$ is the starting point and is a constant, t ranges from 0 to M, and $I_0$ is defined to be zero.

As shown in FIG. 4, the discrete differential unit is realized by modifying the output path from nonlinear function 204. Particularly, the output path is modified to include multipliers 206 and 207 and summing junctions (adders) 205 and 208. Multiplier 206 is used to invert the value of unit $x_{i-1j}$ and present the inverted value to summing junction 205. Summing junction 205 combines the output of nonlinear function element 204 with the output of multiplier 206. The output of summing junction 205 is multiplied by skill factor 1/T in multiplier 207. The output of multiplier 207 is supplied to summing junction 208 where it is combined with the value of unit $x_{i-1j}$ to produce unit value $x_{ij}$. In examples from experimental practice, the time constants T are set to 10 to produce a smooth trajectory output, the learning rate is set equal to zero to prevent learning on the time constants, and initial values for weights are picked from a uniform distribution between $-1$ and $+1$.

From experimental practice in generating trajectories on the letters of the alphabet, it has been learned that large initial time constants prevent the reverse time delay neural network from making fast variations on the output units and, in general, retard the learning process. On the other hand, small time constants increase the difficulty of learning. As it is presently understood, the correct strategy is to adapt time constants to the intrinsic frequencies of the trajectory. When all time constants are set equal to one, the neural network was substantially unable to learn the alphabet. With time constants equal to ten for the (x,y) coordinates of the trajectory and with time constants of one for all other units of the trajectory, good results have been obtained for the reverse time delay neural network.

The presently invention is significantly different from the time delay neural network in the prior art. The degree of difference can be easily shown be the sequence of transformation steps shown in FIGS. 5–8.

Figure 5:
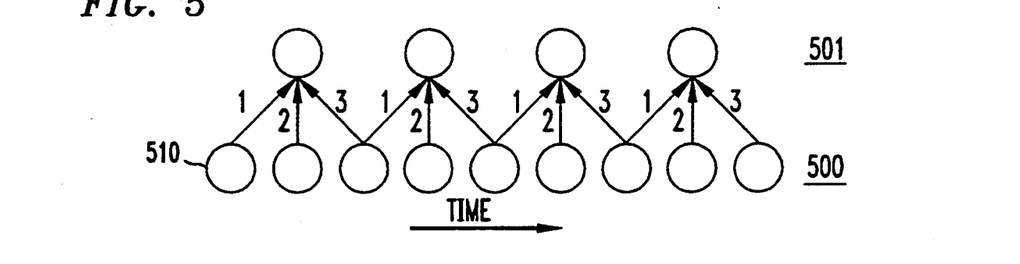
FIG. 5 shows interconnection of a representative group of units between two different layers in a time delay neural network.

The network depicted in FIG. 5 represents the connections (somewhat simplified) between two layers of a time delay neural network. The lower layer represents some sequence in time, which is input via a set of connections to the upper layer, which also represent a sequence in time. The units (e.g., unit 510) of the upper and lower layer (represented by circles) are neurons identical in function to the neuron depicted in FIG. 3. The weights associated to each connection are advantageously shared in time causing the network to be constrained. All the neurons of the upper layer have an identical set of weights, as can be observed in the FIG. 5 by looking at the weight labeling (small numeral "1", "2", and "3"). In time delay neural network architecture, the upper layer 501 can advantageously be undersampled, that is, it may have fewer units than its input layer 500. This practice has two advantages. First, it reduces the number of computations performed by the network by reducing the amount of units which need to be updated. Second, it reduces the amount of states which must be stored in the upper layer. This reduction produces a smooth interpolation effect between states, which affects the ability of the network to generalize. In other words, it affects the ability of the network to produce the correct answer for an input trajectory never encountered before. In the Figure, the subsampling is by a factor two, but this is not restrictive and other subsampling factors greater than two can be used.

Figure 6:
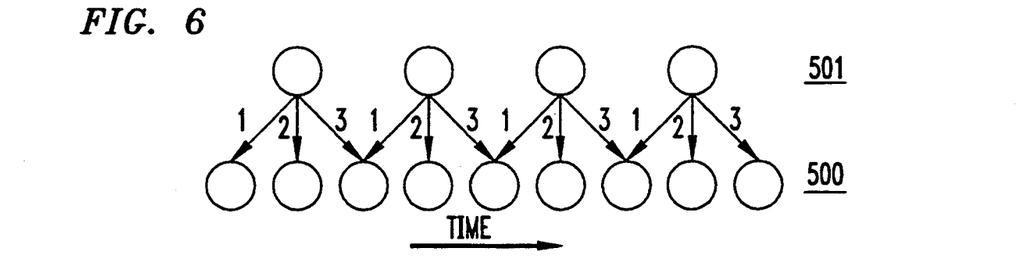
FIG. 6 depicts a reversal of the interconnections from FIG. 5 for a reverse time delay neural network.

If the connections between layers 500 and 501 are reversed, the resulting architecture is as described in FIG. 6. Each neuron in the lower layer 500 becomes an output neuron for the neurons in the upper layer 501. The dataflow direction has been reversed. Each individual neuron of the resulting architecture is still identical in function to the neuron depicted in FIG. 3. The information carried in the states of the neurons of the upper layer of FIG. 6 is a time sequence of four steps or epochs. The information carried in the states of the neurons of the lower layer is a time sequence of nine steps or epochs derived from the preceding sequence by the computation carried out by each neuron. The information process called "subsampling" in FIG. 5 has been replaced by another information process called "oversampling", which is the dual of the former. This process allows the network to compute a finer granularity time sequence of frames from a more general, lower granularity, time sequence of frames. This process is essential for the overall network to be able to produce accurate time sequences (trajectories) from restricted slowly varying input sequences.

In the architecture described in FIG. 6, it can be observed that the units of the lower layer 500 do not each have the same number of incoming connections. This entails that in an actual implementation, each unit would need to remember to which unit of the prior layer it is connected. In the case of FIG. 6, at least two different kernels would need to be distinguished, one for connections 1 and 3, and one for connection 2. This plurality of convolution kernels is undesirable in general because it complicates the implementation of the neural network.

Figure 7:
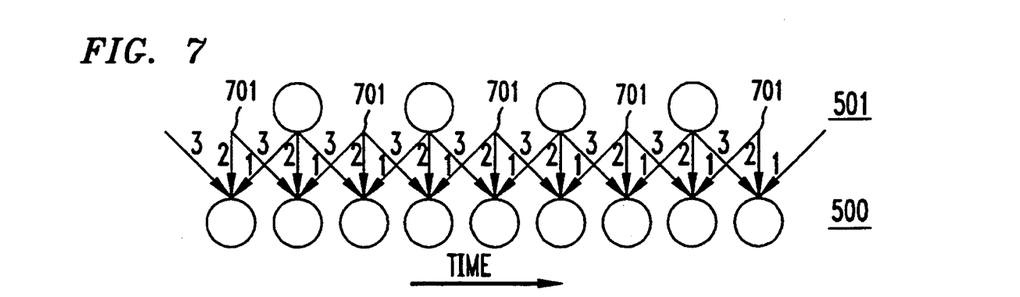
FIGS. 7 and 8 show the interpositioning of additional or phantom state units between the actual units of FIG. 6 in order to simplify the operation and storage required for implementation of the reverse time delay neural network.

In FIG. 7, this problem is circumvented by adding connections to virtual units 701 or, equivalently, units which have their state set to zero. This result is that each unit of the lower layer includes the same number of incoming connection. Only one kernel of connection (3, 2, and 1) is necessary to implement this layer. The kernel can be slid in time from left to right to compute the activation of each units of the lower layer. It should be noted that the virtual units are not affected by changes or values of units in the higher layers.

The introduction of the extra connections to generate a unique kernel raises the question of what should be the state value of the neuron to which they are connected. In FIG. 7, the state value was assumed to be zero. In practice, this is likely to introduce an oscillation, as the kernel is shifted alternatively from a unit with some activation to a unit with zero activation.

Figure 8:
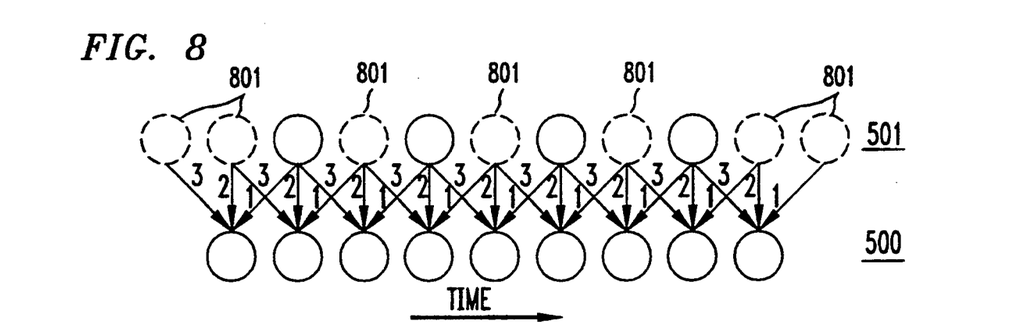

A further improvement on the invention consists in explicitly replacing the zero state value virtual unit of FIG. 7 by a "phantom" unit with a state value, the computation of which is explained below. FIG. 8 represents such a network, with the phantom units depicted by dotted circles (e.g., phantom units 801). Again in this case, the oversampling from the upper layer to the lower layer is two in the Figure, but the invention is not restricted to that number and higher oversampling rates are also possible.

Figure 10:
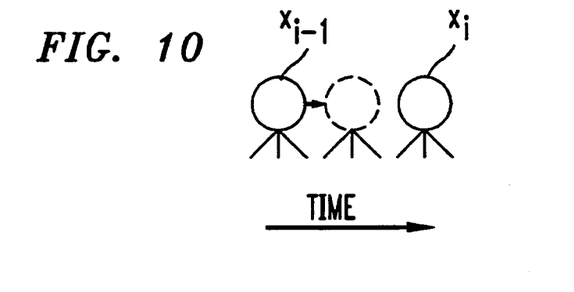
FIGS. 10–13 show alternative implementations of the phantom state units in a layer of the reverse time delay neural network.

FIGS. 10, 11, 12 and 13 depict different embodiments for setting the values of phantom units. The simplest embodiment consists of duplicating the state of the previous adjacent unit, and is depicted in FIG. 10. This embodiment is straight forward to implement. The phantom unit $x_i$ needs only to be a linear unit with one incoming connection with a weight of one from the closest real unit on the left, $x_{i-1}$.

If several phantom units are used (with a large oversampling factor) they will each have a connection to the closest real unit on the left. This implementation has the possible drawback that the virtual time sequence (that is the time sequence which includes the phantom units) carried out by the upper layer has discontinuities when going from a phantom unit to a non-phantom unit. A possible side effect is that these discontinuities will create some noise, at the frequency of the real units of the upper layer, on the time sequence of the lower layer.

Figure 11:
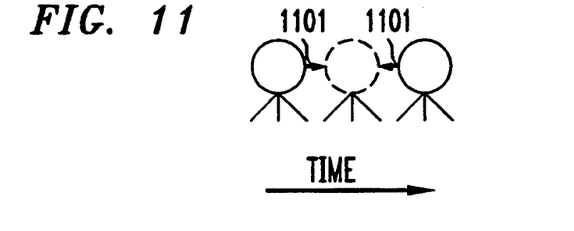

The architecture depicted in FIG. 11 attempts to diminish that effect by having the phantom unit compute a linear interpolation between the state values of the adjacent real units. Again this can be easily implemented by a linear unit with two incoming connections 1101 from the adjacent real (non-phantom) units. In the case of an oversampling of two like in FIG. 11, the weights to the phantom unit are set to 1. If the oversampling is more than two, a weighted average is necessary to do the correct interpolation of each of the phantom units.

Figure 13:
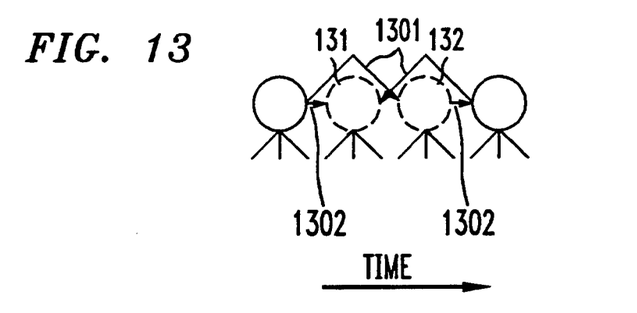

The case where the oversampling is three is depicted in FIG. 13. In this case the longer connections 1301 have a weight of $\frac{1}{3}$ while the shorter connections 1302 have a weight of $\frac{2}{3}$. The value of the weight represent the normalized distance (in number of neurons) from the phantom unit to the real unit to which it is connected.

Figure 12:
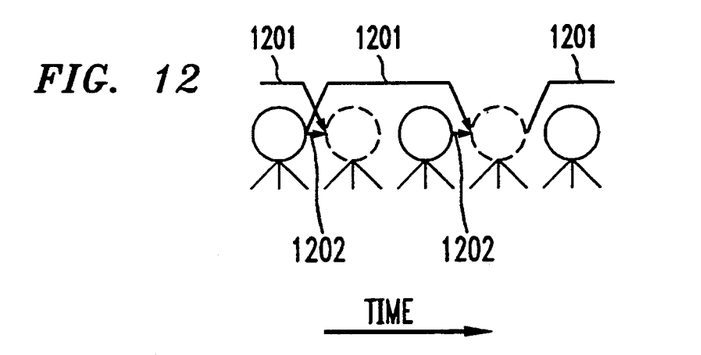

In applications where time is critical, it may be undesirable to have connections which connect a unit corresponding to a higher time step to a unit corresponding to a lower time step. This was the case in FIGS. 11 and 13 where some connection arrows point in the opposite direction from the time arrow. This problem can be circumvented by having the phantom unit extrapolate its value from real units corresponding to previous time steps. This is depicted in FIG. 12, where the phantom unit extrapolates from the two previous real units. In the case of linear interpolation the value of the phantom unit would be, $$x(t)=x(t-1)+\tfrac{1}{2}(x(t-1)-x(t-3))=3/2$$
$$x(t-1(-\tfrac{1}{2}x(t-3))$$

This again can be easily implemented by a linear unit connected to the two real units of preceding time steps with weight values equal to 3/2 for the unit of the preceding time step (connection 1301 for phantom unit 131) and $-\tfrac{1}{2}$ for the real unit following it (connection 1302 for phantom unit 131).

A further refinement is to compute a second order approximation instead of a linear interpolation. This would involve three connections to the real units of previous time steps. More complex scheme could also include a non-linear phantom unit, and connections to other phantom units to make higher order interpolation (polynomial, spline, etc . . . ).

Many other architectures are possible to implement phantom units, and the invention is not restricted to the ones described above. Basically, the phantom units are meant to provide some intermediate values between the real units to help the weight kernel compute a smooth time sequence from another, undersampled, time sequence. The phantom unit computation can be advantageously implemented by a neuron with connection to the adjacent real or phantom units.

The advantage of using a regular neuron to implement a phantom unit is that the learning mechanism for the weights of the outgoing connections of a phantom unit is the same as for regular units. Therefore, the back propagation embodiment can be used indiscriminately through phantom units. In most cases, however, the incoming weights of a phantom unit are not subjected to learning.

Figure 9:
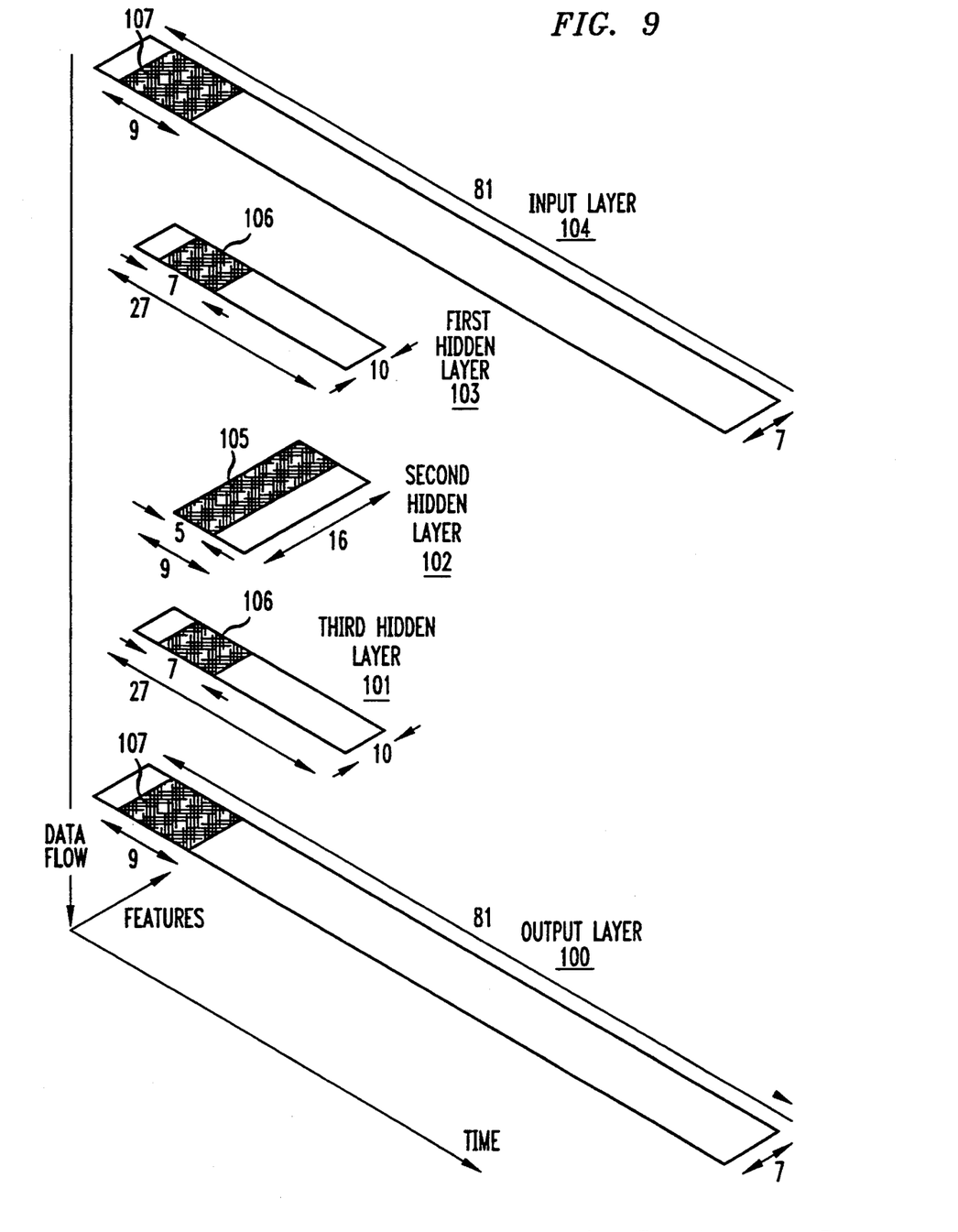
FIG. 9 shows the interconnection of a time delay neural network with a reverse time delay neural network which is capable of generating a trajectory such as a forecast trajectory from an existing, dynamically changing trajectory.

As shown in FIG. 9, a partial time delay neural network is connected to a partial reverse time delay neural network. The modifier partial is used because each network has at least one layer omitted therefrom. For example, by omitting the output layer from the time delay neural network and by omitting the input layer from the reverse time delay neural network, the resulting networks share the intermediate second hidden layer 102—layer 102 is an output layer for the time delay neural network while it serves as the input layer for the reverse time delay neural network.

It should be understood that the principles of the present invention apply to time-series prediction such as for the control of power generation and distribution and the prediction of power grid usage and loading. Other applications arise such as robotic arm manipulator controllers and factory automation control systems. In the former case, the neural network responds to plan inputs such as torque and the like while computing a desired trajectory for the robotic arm.

What is claimed is:

1. Time delay neural network apparatus for outputting a trajectory in response to an input label frame wherein the trajectory is represented as a temporally related sequence of frames, each frame including a plurality of feature elements, the apparatus comprising, an input layer means for connecting the input label frame to at least a first hidden layer means, first layer means for oversampling constrained features from its respective input to generate the trajectory related to the input label frame, wherein the first layer means is constrained.

2. The apparatus as defined in claim 1 wherein the first layer means includes phantom units interleaved with actual units, each phantom unit for inputting an intermediate input value to computation elements connected to a next subsequent layer means.

3. The apparatus as defined in claim 2 wherein the value of a phantom unit is related to the value of at least one adjacent actual unit.

4. The apparatus as defined in claim 1 wherein the first layer means includes a plurality of units, each unit having associated therewith a computational element for computing the value of that same unit in response to the value of at least one unit in a priorly connected layer means and the value of an adjacent unit in the same layer means as that same unit.

5. A massively parallel computation network for generating a trajectory in response to an input label, the network comprising a first constrained feature creation layer for generating features from said input label and for oversampling said input label, said first constrained feature creation layer being connected to said input label, a second constrained feature creation layer for generating features from said first constrained feature creation layer and for oversampling said first feature creation layer, and an output layer for creating features from said second constrained feature creation layer and for oversampling said second constrained feature creation layer to generate said trajectory.

6. Time delay neural network apparatus for outputting a trajectory in response to an input label frame wherein the trajectory is represented as a temporally related sequence of frames, each frame having a plurality of feature elements, the apparatus comprising, an input layer means for fully connecting the input label frame to at least a first hidden layer means, a plurality of hidden layer means including first and second hidden layer means connected at least substantially in succession, each hidden layer means for oversampling constrained features from its respective input to create a less complex temporally ordered frame sequence, and output layer means connected to at least the second hidden layer means of the plurality of hidden layer means for oversampling the less complex temporally ordered frame sequence from the second hidden layer means to generate the trajectory which is related to the input label frame, wherein the temporally ordered frame sequence in each respective layer means is at least twice as long as the sequence in priorly connected layer means and wherein the number of feature elements per frame decreases monotonically in each layer means, from the input label frame to the trajectory, and the plurality of hidden layer means and the output layer means are constrained.

7. The apparatus as defined in claim 6 wherein each hidden layer means of the plurality of hidden layer means includes phantom units interleavaed with actual units for inputting intermediate input values to computation elements connected to a next subsequent layer means.

8. The apparatus as defined in claim 7 wherein the value of a phantom unit is related to the value of at least one adjacent actual unit.

9. The apparatus as defined in claim 6 wherein each hidden layer means and the output layer means includes a plurality of units, each unit having associated therewith a computational element for computing the value of that same unit in response to the value of at least one unit in a priorly connected layer means and the value of an adjacent unit in the same layer means as that same unit.

10. The apparatus as defined in claim 6 wherein the input label frame is a sequence of at least first and second frames.

11. The apparatus as defined in claim 1 wherein the input label frame is a sequence of at least first and second frames.

* * * * *